(12) United States Patent
Nakajima et al.

(10) Patent No.: US 6,391,496 B1
(45) Date of Patent: May 21, 2002

(54) LITHIUM SECONDARY BATTERY WITH ORTHORHOMBIC MOLYBDENUM AND NIOBIUM OXIDE ELECTRODES

(75) Inventors: Hiroshi Nakajima, Hirakata; Taeko Ota, Osaka; Hiroshi Watanabe, Sumoto; Shin Fujitani, Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/506,588

(22) Filed: Feb. 18, 2000

(30) Foreign Application Priority Data

Mar. 25, 1999 (JP) .......................... 11-080905
Mar. 25, 1999 (JP) .......................... 11-080906

(51) Int. Cl.⁷ ............................ H01M 4/40; H01M 4/48
(52) U.S. Cl. ................................. 429/231.5; 429/231.1
(58) Field of Search ..................... 429/231.95, 231.1, 429/231.5, 218.1

(56) References Cited

U.S. PATENT DOCUMENTS

| | | | | |
|---|---|---|---|---|
| 4,876,628 A | * | 10/1989 | Goldner | 361/313 |
| 5,258,245 A | * | 11/1993 | Takata | 429/218 |
| 5,340,670 A | * | 8/1994 | Takami | 429/194 |
| 5,558,961 A | * | 9/1996 | Doeff | 429/224 |
| 5,855,862 A | * | 1/1999 | Grenier | 423/592 |
| 6,040,087 A | * | 3/2000 | Kawakami | 429/218.1 |
| 6,040,089 A | * | 3/2000 | Manev | 429/231.1 |
| 6,210,836 B1 | * | 4/2001 | Takada | 429/231.95 |

FOREIGN PATENT DOCUMENTS

| | | | | |
|---|---|---|---|---|
| FR | 2730988 | * | 8/1996 | ............ H01M/4/24 |
| JP | A5990359 | | 5/1984 | |
| JP | A7176324 | | 7/1995 | |
| JP | 09-143268 | * | 4/1998 | ............ H01M/4/58 |
| JP | A11250907 | | 9/1999 | |
| JP | A6283173 | | 10/1999 | |

OTHER PUBLICATIONS

Solid State Ionics, T. Tsumura et al., 104, pp. 183–189, 1997.
J. Electrochem. Soc., A. Manthiram et al., vol. 143, No. 7, pp. 143–145, 1996.
Electrochimica Acta., N. Kumagai et al., vol. 28, No. 1, pp. 17–22, 1983.
Journal of Power Sources, N. Kumagai et al., vol. 20, pp. 193–198, 1987.
Denki Kagaku, N. Kumagai et al., vol. 50, No. 8, pp. 704–707, 1982.

\* cited by examiner

Primary Examiner—Gabrielle Brouillette
Assistant Examiner—Mark Ruthkosky
(74) Attorney, Agent, or Firm—Birch, Stewart, Kolasch & Birch, LLP

(57) ABSTRACT

In a lithium secondary battery of this invention, either a positive electrode or a negative electrode includes, as an active material, an orthorhombic composite oxide represented by a composition formula, $M_xMo_{1-x}O_y$, wherein M is at least one transition element selected from the group consisting of Cu, V, Mn, Fe, Co and Ni; $0<x \leq 0.46$; and $2.6 \leq y \leq 3.1$, or a composition formula, $M_xNb_{2-x}O_y$, wherein M is at least one transition element selected from the group consisting of V, Cr, Mo, W. Mn and Fe; $0<x \leq 0.6$; and $4.7 \leq y \leq 5.3$, or an orthorhombic lithium-containing composite oxide obtained by incorporating lithium into the orthorhombic composite oxide. Thus, the lithium secondary battery can exhibit better charge-discharge cycle performance than a lithium secondary battery using $MoO_3$ or $Nb_2O_5$ as an active material.

10 Claims, 3 Drawing Sheets

A

LITHIUM SECONDARY BATTERY WITH ORTHORHOMBIC MOLYBDENUM AND NIOBIUM OXIDE ELECTRODES

BACKGROUND OF THE INVENTION

This application claims the Paris convention priority of Japanese Patent Application No. 11-27934/1999 filed on Feb. 4, 1999, which is incorporated herein by reference.

The present invention relates to a lithium secondary battery, and more particularly, it relates to improvement of an active material for the purpose of providing a lithium secondary battery exhibiting good charge-discharge cycle performance.

As a positive electrode active material of a lithium secondary battery, $MoO_3$ (molybdenum trioxide) and $Nb_2O_5$ (diniobium pentoxide) have been proposed (T. Tsumura, Solid State Ionic, Vol. 104, p. 183 (1997) and Japanese Laid-Open Patent Publication No. 59-90359/1984).

Although $MoO_3$ belongs to the orthorhombic system and is a comparatively stable oxide among molybdenum oxides, the charge-discharge cycle performance of a lithium secondary battery using $MoO_3$ as a positive electrode active material is not good. This is because the crystal structure of $MoO_3$ is largely changed through repeated expansion and shrinkage during charge and discharge. Also, $Nb_2O_5$ belongs to the orthorhombic system and is the most stable oxide among niobium oxides, but the charge-discharge cycle performance of a lithium secondary battery using $Nb_2O_5$ as a positive electrode active material is not good. This is because the crystal structure of $Nb_2O_5$ degrades in a small number of cycles through repeated expansion and shrinkage during charge and discharge.

Accordingly, an object of the invention is providing a lithium secondary battery exhibiting better charge-discharge cycle performance than the lithium secondary battery using $MoO_3$ or $Nb_2O_5$ as a positive electrode active material.

SUMMARY OF THE INVENTION

One lithium secondary battery (first battery) of this invention comprises a positive electrode, a negative electrode and a nonaqueous electrolyte, and one of the positive electrode and the negative electrode includes, as an active material, an orthorhombic composite oxide represented by a composition formula, $M_xMo_{1-x}O_y$ (wherein M is at least one transition element selected from the group consisting of Cu, V, Mn, Fe, Co and Ni; $0<x\leq0.46$; and $2.6\leq y\leq3.1$), or an orthorhombic lithium-containing composite oxide obtained by incorporating lithium into the orthorhombic composite oxide.

Another lithium secondary battery (second battery) of this invention comprises a positive electrode, a negative electrode and a nonaqueous electrolyte, and the positive electrode includes, as an active material, an orthorhombic composite oxide represented by a composition formula, $M_xNb_{2-x}O_y$ (wherein M is at least one transition element selected from the group consisting of V, Cr, Mo, W. Mn and Fe; $0<x\leq0.6$; and $4.7\leq y\leq5.3$), or an orthorhombic lithium-containing composite oxide obtained by incorporating lithium into the orthorhombic composite oxide.

As a result, the invention provides a lithium secondary battery exhibiting better charge-discharge cycle performance than a lithium secondary battery using $MoO_3$ or $Nb_2O_5$ as a positive electrode active material.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE INVENTION

Figure 1:
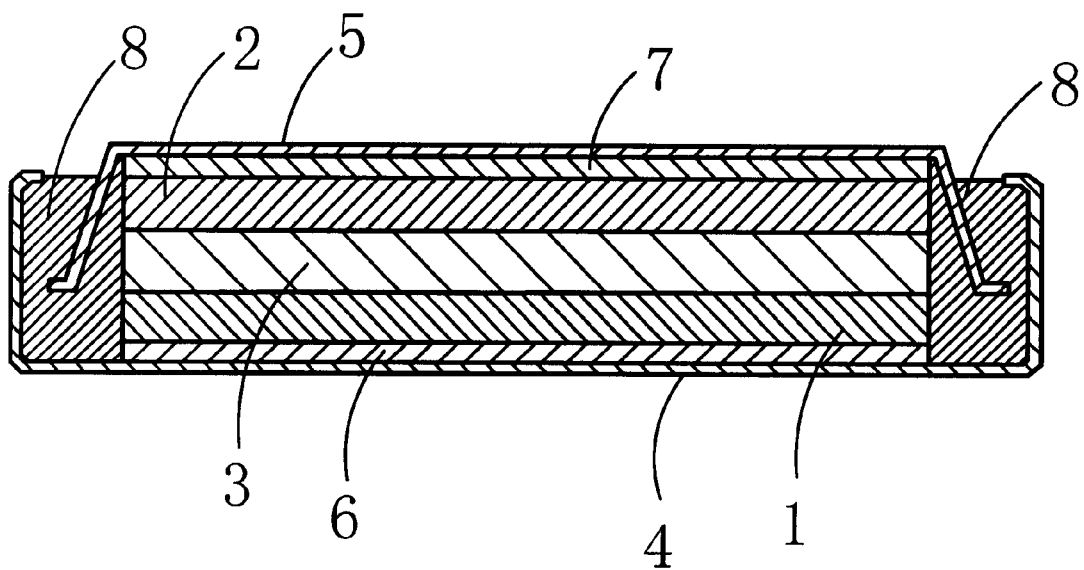
FIG. 1 is a sectional view of a flat lithium secondary battery fabricated in an embodiment.

In the first battery of the invention, either the positive electrode or the negative electrode includes, as an active material, an orthorhombic composite oxide represented by a composition formula, $M_xMo_{1-x}O_y$ (wherein M is at least one transition element selected from the group consisting of Cu, V, Mn, Fe, Co and Ni; $0<x\leq0.46$; and $2.6\leq y\leq3.1$), or an orthorhombic lithium-containing composite oxide obtained by incorporating lithium into the orthorhombic composite oxide.

The composite oxide has a crystal structure in which the specific transition element M is substituted for a part of Mo in the crystal lattice of the $MoO_3$ phase, and this crystal structure is less degraded through charge-discharge cycles than the crystal structure of $MoO_3$. This is because the chemical bond between M and O (oxygen) is stronger than the chemical bond between Mo and O in the crystal lattice.

In the composition formula, x should be 0.46 or less because when x exceeds 0.46, the composite oxide includes an unstable oxide phase of the transition element M, resulting in degrading the charge-discharge cycle performance. In order to obtain a lithium secondary battery exhibiting very good charge-discharge cycle performance, x is preferably 0.02 through 0.45 and more preferably 0.05 through 0.40 in the composition formula. Also in the composition formula, y should be 2.6 through 3.1 because y never falls off from this range although it is varied depending upon the kind of transition element M and the baking temperature and atmosphere adopted for synthesizing the composite oxide. The stability of the composite oxide (charge-discharge cycle performance) is minimally changed in accordance with y.

In the case where the first battery uses the composite oxide or the lithium-containing composite oxide as a positive electrode active material, specific examples of the negative electrode material are a substance capable of electrochemically occluding and discharging lithium ions and metallic lithium. Such a type of first battery has a charge voltage of approximately 3 V and a discharge voltage of approximately 2 V. Examples of the substance capable of electrochemically occluding and discharging lithium ions are a carbon material, such as graphite, coke and an organic baked substance, and lithium alloy such as lithium-aluminum alloy, lithium-magnesium alloy, lithium-indium alloy and lithium-aluminum-manganese alloy. For obtaining a lithium secondary battery exhibiting good charge-discharge cycle performance, the negative electrode material is preferably a carbon material with no fear of occurrence of an internal short-circuit derived from dendrite (electrodeposited lithium with a branching treelike appearance) penetrating through a separator. When the lithium-containing composite oxide is used as the positive electrode active material, a carbon material including lithium or not including lithium is used as the negative electrode material. When the composite oxide not including lithium is used as the positive electrode active material, a lithium-containing carbon material is used as the negative electrode material.

In the case where the first battery uses the composite oxide or the lithium-containing composite oxide as the negative electrode active material, a specific example of the positive electrode material is a lithium-containing transition metal oxide such as $LiCoO_2$, $LiNiO_2$, $LiMn_2O_4$, $LiMnO_2$, lithium-containing $MnO_2$, $LiCo_{0.5}Ni_{0.5}O_2$, and $LiCo_{0.2}Ni_{0.7}Mn_{0.1}O_2$. Such a type of first battery has a charge voltage of approximately 2.5 V and a discharge voltage of approximately 1.5 V, and exhibits very good charge-discharge cycle performance. This is because the charge voltage is as low as approximately 2.5 V and hence the nonaqueous electrolyte can be suppressed from decomposing during charge.

Since the first battery includes the specific composite oxide or lithium-containing composite oxide having a crystal structure more stable than that of $MoO_3$ as the active material of the positive electrode or the negative electrode, it can exhibit better charge-discharge cycle performance than a lithium secondary battery using $MoO_3$ as an active material.

In the second battery, the positive electrode includes, as an active material, an orthorhombic composite oxide represented by a composition formula, $M_xNb_{2-x}O_y$ (wherein M is at least one transition element selected from the group consisting of V, Cr, Mo, W. Mn and Fe; $0<x\leq 0.6$; and $4.7\leq y\leq 5.3$), or an orthorhombic lithium-containing composite oxide obtained by incorporating lithium into the orthorhombic composite oxide. Herein, the first battery and the second battery are sometimes comprehensively referred to as the present battery.

Since the composite oxide has a crystal structure in which the specific transition element M is substituted for a part of Nb in the crystal lattice of the $Nb_2O_5$ phase, this crystal structure is less degraded through the charge-discharge cycles than that of $Nb_2O_5$. This is probably because the chemical bond between M and O (oxygen) is stronger than the chemical bond between Nb and O in the crystal lattice.

In the composition formula, x should be 0.6 or less because when x exceeds 0.6, the composite oxide includes an unstable oxide phase of the transition element M, resulting in degrading the charge-discharge cycle performance. For obtaining a lithium secondary battery exhibiting very good charge-discharge cycle performance, x is preferably 0.02 through 0.3 in the composition formula. Also in the composition formula, y should be 4.7 through 5.3 because y never falls off from this range although it is varied depending upon the kind of transition element M and the baking temperature and atmosphere adopted for synthesizing the composite oxide. The stability of the composite oxide (charge-discharge cycle performance) is minimally varied in accordance with y.

A specific example of the second battery is a lithium secondary battery including the composite oxide or the lithium-containing composite oxide as a positive electrode active material and a substance capable of electrochemically occluding and discharging lithium ions or metallic lithium as a negative electrode material (which has a charge voltage of approximately 3.0 V and a discharge voltage of approximately 1.6 V). Examples of the substance capable of electrochemically occluding and discharging lithium ions are a carbon material, such as graphite, coke and an organic baked substance, and lithium alloy such as lithium-aluminum alloy, lithium-magnesium alloy, lithium-indium alloy and lithium-aluminum-manganese alloy. For obtaining a lithium secondary battery exhibiting good charge-discharge cycle performance, the negative electrode material is preferably a carbon material with no fear of occurrence of an internal short-circuit derived from dendrite (electrodeposited lithium with a branching treelike appearance) penetrating through a separator. When the lithium-containing composite oxide is used as the positive electrode active material, a carbon material including lithium or not including lithium is used as the negative electrode material. When the composite oxide not including lithium is used as the positive electrode active material, a lithium-containing carbon material is used as the negative electrode material.

Since the second battery includes, as a positive electrode active material, the specific composite oxide or lithium-containing composite oxide having a crystal structure more stable than that of $Nb_2O_5$, it can exhibit better charge-discharge cycle performance than a lithium secondary battery using $Nb_2O_5$ as a positive electrode active material.

The nonaqueous electrolyte of the present battery is not particularly specified as far as a solvent and a solute included therein do not decompose at a voltage applied during charge, discharge and storage. Examples of the solvent of the nonaqueous electrolyte are a mixed solvent including a cyclic carbonate, such as ethylene carbonate, propylene carbonate and butylene carbonate, and a chain carbonate, such as dimethyl carbonate, diethyl carbonate and methylethyl carbonate; and a mixed solvent including a cyclic carbonate and an ether solvent such as 1,2-diethoxyethane and 1,2-dimethoxyethane. Examples of the solute of the nonaqueous electrolyte are $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_4SO_2)_3$ and $LiC(C_2F_5SO_2)_3$. One of these lithium salts can be singly used, or two or more of them can be used together if necessary. Alternatively, a gel electrolyte obtained by impregnating a polymer, such as poly(ethylene oxide) and polyacrylonitrile, with a nonaqueous electrolyte or an inorganic solid electrolyte such as LiI and $Li_3N$ can be used as the nonaqueous electrolyte.

EMBODIMENTS

Other features of the invention will become more apparent in the course of the following descriptions of exemplary embodiments which are given for illustration of the invention and not intended to be limiting thereof.

EXPERIMENT 1

First batteries and comparative batteries were fabricated so as to compare the charge-discharge cycle performance thereof.

EMBODIMENTS 1 THROUGH 6

Preparation of Positive Electrodes:

Copper nitrate ($Cu(NO_3)_2$), vanadium chloride ($VCl_3$), manganese acetate ($Mn(CH_3COO)_2$), iron nitrate ($Fe(NO_3)_3$), cobalt acetate ($Co(CH_3COO)_2$) or nickel nitrate ($Ni(NO_3)_2$) and molybdenum carbonyl ($Mo(CO)_6$) were weighed out in an atomic ratio between M (i.e., Cu, V, Mn, Fe, Co or Ni) and Mo of 0.20:0.80, and mixed in a mortar. The resultant mixture was pressed in a disk mold having a diameter of 17 mm at a pressure of 115 kg/cm², and the resultant was baked in a stream of oxygen at 700° C. for 12 hours, and crushed in a mortar, thereby preparing a powder with an average particle size of 10 μm of a composite oxide represented by a composition formula, $Cu_{0.20}Mo_{0.80}O_3$, $V_{0.20}Mo_{0.80}O_3$, $Mn_{0.20}Mo_{0.80}O_3$, $Fe_{0.20}Mo_{0.8}O_3$, $Co_{0.20}Mo_{0.80}O_3$ or $Ni_{0.20}Mo_{0.80}O_3$.

Each of the composite oxide powders serving as a positive electrode active material, a carbon powder serving as a conductive agent and a poly(vinylidene fluoride) powder serving as a binder were mixed in a weight ratio of 85:10:5, and the resultant was mixed with NMP (N-methyl-2-pyrrolidone) to give slurry. The slurry was applied on one surface of an aluminum collector with a thickness of 20 µm by a doctor blade method and dried at 150° C., and the resultant was punched into a disk. Thus, positive electrodes each with a diameter of 10 mm and a thickness of approximately 80 µm were prepared.

Each of the positive electrodes was stacked on disk-shaped metallic lithium serving as a counter electrode with a separator (a polypropylene film with ionic permeability) sandwiched therebetween, thereby preparing an electrode body. The electrode body was immersed in a nonaqueous electrolyte obtained by dissolving $LiPF_6$ in a concentration of 1 mol/liter in a mixed solvent including ethylene carbonate and diethyl carbonate in a volume ratio of 1:1. Under this condition, electrolysis was conducted with a current of 100 µA to 1.5 V (vs. Li/Li$^+$), so as to incorporate lithium into the composite oxide of each positive electrode.

Preparation of Negative Electrode:

A natural graphite powder and a poly(vinylidene fluoride) powder serving as a binder were mixed in a weight ratio of 95:5, and the resultant was mixed with NMP (N-methyl-2-pyrrolidone) to give slurry. The slurry was applied on one surface of a copper collector with a thickness of 20 µm by the doctor blade method, and dried at 150° C., and the resultant was punched into a disk. Thus, a negative electrode with a diameter of 10 mm and a thickness of approximately 60 µm was prepared.

Preparation of Nonaqueous Electrolyte:

A nonaqueous electrolyte was prepared by dissolving $LiPF_6$ in a concentration of 1 mol/liter in a mixed solvent including ethylene carbonate and diethyl carbonate in a volume ratio of 1:1.

Fabrication of Lithium Secondary Batteries:

Each of the positive electrodes, the negative electrode and the nonaqueous electrolyte were used for fabricating flat lithium secondary batteries A1 through A6 (first batteries). As a separator, a polypropylene film with ionic permeability was used. FIG. 1 is a sectional view of the thus fabricated lithium secondary battery. The lithium secondary battery A of FIG. 1 comprises a positive electrode 1, a negative electrode 2, a separator 3 for separating the electrodes, a positive electrode can 4, a negative electrode can 5, a positive electrode collector 6, a negative electrode collector 7, an insulating packing 8 of polypropylene and the like. The positive electrode 1 and the negative electrode 2 opposing each other with the separator 3 impregnated with the nonaqueous electrolyte sandwiched therebetween are housed in a battery can formed by the positive electrode can 4 and the negative electrode can 5. The positive electrode 1 is connected to the positive electrode can 4 through the positive electrode collector 6, and the negative electrode 2 is connected to the negative electrode can 5 through the negative electrode collector 7, so that chemical energy generated within the battery can can be taken out as electrical energy.

EMBODIMENTS 7 AND 8

A positive electrode was prepared in the same manner as in Embodiment 1, whereas the electrolysis for incorporating lithium into the composite oxide ($Cu_{0.20}Mo_{0.80}O_3$) of the positive electrode was not conducted. Furthermore, a rolled sheet of metallic lithium or a lithium-aluminum alloy sheet (with a lithium content of 20.6 wt %) was punched into a disk. Thus, two kinds of negative electrodes each with a diameter of 10 mm and a thickness of 1.0 mm were prepared. First batteries A7 and A8 were fabricated in the same manner as in Embodiment 1 except that this positive electrode and each of these negative electrodes were used.

EMBODIMENTS 9 THROUGH 11

$LiCoO_2$, $LiNiO_2$ or $LiMn_2O_4$ serving as a positive electrode active material, a carbon powder serving as a conductive agent and a poly(vinylidene fluoride) powder serving as a binder were mixed in a weight ratio of 85:10:5, and the resultant was mixed with NMP (N-methyl-2-pyrrolidone) to give slurry. The slurry was applied on one surface of an aluminum collector with a thickness of 20 µm by the doctor blade method and dried at 150° C., and the resultant was punched into a disk. Thus, positive electrodes each with a diameter of 10 mm and a thickness of approximately 80 µm were prepared. Furthermore, a powder with an average particle size of 10 µm of the composite oxide represented by the composition formula, $Cu_{0.20}Mo_{0.20}O_3$, (which is the same as that prepared in Embodiment 1), a carbon powder serving as a conductive agent and a poly(vinylidene fluoride) powder serving as a binder were mixed in a weight ratio of 85:10:5, and the resultant was mixed with NMP (N-methyl-2-pyrrolidone) to give slurry. The slurry was applied on one surface of a copper collector with a thickness of 20 µm by the doctor blade method and dried at 150° C., and the resultant was punched into a disk. Thus, a negative electrode with a diameter of 10 mm and a thickness of 1.0 mm was prepared. First batteries A9 through A11 were fabricated in the same manner as in Embodiment 1 except that each of these positive electrodes and this negative electrode were used.

COMPARATIVE EXAMPLE 1

A $MoO_3$ powder serving as a positive electrode active material, a carbon powder serving as a conductive agent and a poly(vinylidene fluoride) powder serving as a binder were mixed in a weight ratio of 85:10:5, and the resultant was mixed with NMP to give slurry. The slurry was applied on one surface of an aluminum collector with a thickness of 20 µm by the doctor blade method and dried at 150° C., and the resultant was punched into a disk. Thus, a positive electrode with a diameter of 10 mm and a thickness of approximately 80 µm was prepared. The used $MoO_3$ powder was previously baked at 600° C., and $MoO_3$ powders mentioned below were all previously baked at 600° C. Subsequently, the electrolysis was conducted under the same conditions as in Embodiment 1, thereby incorporating lithium into $MoO_3$ of the positive electrode. A comparative battery B1 was fabricated in the same manner as in Embodiment 1 except that this positive electrode was used.

COMPARATIVE EXAMPLES 2 AND 3

A $MoO_3$ powder serving as a positive electrode active material, a carbon powder serving as a conductive agent and a poly(vinylidene fluoride) powder serving as a binder were mixed in a weight ratio of 85:10:5, and the resultant was mixed with NMP to give slurry. The slurry was applied on one surface of an aluminum collector with a thickness of 20 µm by the doctor blade method and dried at 150° C., and the resultant was punched into a disk. Thus, a positive electrode with a diameter of 10 mm and a thickness of approximately 80 µm was prepared. A rolled sheet of metallic lithium or a lithium-aluminum alloy sheet (with a lithium content of 20.6 wt %) was punched into a disk. Thus, two kinds of negative electrodes each with a diameter of 10 mm and a thickness of 1.0 mm were prepared. Comparative batteries B2 and B3 were fabricated in the same manner as in Comparative Example 1 except that this positive electrode and each of these negative electrodes were used.

Charge-discharge Cycle Performance of Respective Batteries

With respect to each of the first batteries A1 through A6 and the comparative battery B1, 50 charge-discharge cycles were run in each cycle of which the battery was charged to 3.0 V with 100 μA and discharged to 1.5 V with 100 μA, so as to obtain the capacity retention ratio at the 50th cycle in accordance with a formula below. With respect to the first batteries A7 and A8 and the comparative batteries B2 and B3, each battery was discharged to 1.5 V with 100 μA, and then 50 charge-discharge cycles were run in each cycle of which the battery was charged to 3.0 V with 100 μA and discharged to 1.5 V with 100 μA, so as to obtain the capacity retention ratio at the 50th cycle in accordance with the formula below. With respect to each of the first batteries A9 through A11, 50 charge-discharge cycles were run in each cycle of which the battery was charged to 2.5 V with 100 μA and discharged to 0.5 V with 100 μA, so as to obtain the capacity retention ratio at the 50th cycle in accordance with the formula below. The charge-discharge cycle tests were all conducted at room temperature (25° C.). The discharge voltage (an average discharge voltage until the discharge end voltage was attained), the initial capacity (the discharge capacity at the 1st cycle) and the capacity retention ratio of each battery are shown in Table 1.

Capacity retention ratio (%)=(Discharge capacity at 50th cycle/ Discharge capacity at 1st cycle)×100

TABLE 1

| Battery | Positive electrode active material | Negative electrode material | Discharge voltage (V) | Initial capacity (mAh) | Capacity retention ratio (%) |
| --- | --- | --- | --- | --- | --- |
| A1 | $Cu_{0.2}Mo_{0.8}O_3$ | graphite | 2.2 | 1.22 | 88 |
| A2 | $V_{0.2}Mo_{0.8}O_3$ | graphite | 2.2 | 1.21 | 88 |
| A3 | $Mn_{0.2}Mo_{0.8}O_3$ | graphite | 2.2 | 1.20 | 87 |
| A4 | $Fe_{0.2}Mo_{0.8}O_3$ | graphite | 2.2 | 1.20 | 86 |
| A5 | $Co_{0.2}Mo_{0.8}O_3$ | graphite | 2.2 | 1.20 | 86 |
| A6 | $Ni_{0.2}Mo_{0.8}O_3$ | graphite | 2.2 | 1.20 | 85 |
| A7 | $Cu_{0.2}Mo_{0.8}O_3$ | metallic lithium | 2.2 | 1.20 | 71 |
| A8 | $Cu_{0.2}Mo_{0.8}O_3$ | lithium alloy | 1.8 | 1.20 | 76 |
| A9 | $LiCoO_2$ | $Cu_{0.2}Mo_{0.8}O_3$ | 1.5 | 1.20 | 91 |
| A10 | $LiNiO_2$ | $Cu_{0.2}Mo_{0.8}O_3$ | 1.3 | 1.20 | 90 |
| A11 | $LiMn_2O_4$ | $Cu_{0.2}Mo_{0.8}O_3$ | 1.5 | 1.20 | 90 |
| B1 | $MoO_3$ | graphite | 2.2 | 1.15 | 60 |
| B2 | $MoO_3$ | metallic lithium | 2.2 | 1.15 | 41 |
| B3 | $MoO_3$ | lithium alloy | 1.8 | 1.12 | 47 |

It is understood from Table 1 that the first batteries A1 through A11 have large capacity retention ratios and exhibit better charge-discharge cycle performance than the comparative batteries B1 through B3. Furthermore, on the basis of comparison in the capacity retention ratio between the first battery A1 and the first batteries A7 and A8, it is understood that graphite (carbon material) with no fear of generation of dendrite during repeated charge and discharge is preferred as the negative electrode material for obtaining a lithium secondary battery exhibiting good charge-discharge cycle performance. Moreover, on the basis of the results that the first batteries A9 through A11 have particularly large capacity retention ratios among the first batteries, it is understood that it is preferred to use a lithium-containing transition metal oxide as the positive electrode active material and use the composite oxide of this invention as the negative electrode active material. The first batteries A9 through A11 have particularly large capacity retention ratios of 90 through 91% because the charge voltage is as low as 2.5 V and hence the decomposition of the nonaqueous electrolyte is suppressed.

EXPERIMENT 2

The relationship between x in a composition formula, $M_xMo_{1-x}O_3$, and the charge-discharge cycle performance was examined.

Figure 2:
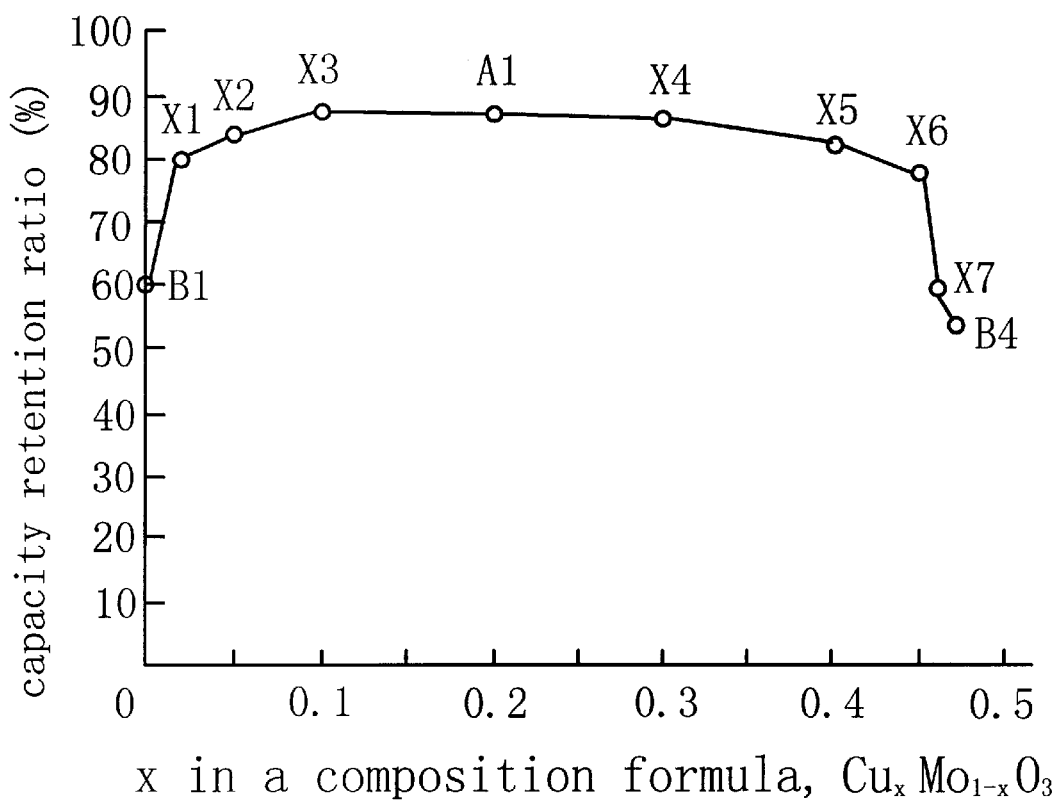
FIG. 2 is a graph for showing the relationship between x in a composition formula, $Cu_xMo_{1-x}O_3$, and charge-discharge cycle performance.

Copper nitrate ($Cu(NO_3)_2$) and molybdenum carbonyl ($Mo(CO)_6$) were weighed out in an atomic ratio between Cu and Mo of 0.20:0.98, 0.05:0.95, 0.10:0.90, 0.30:0.70, 0.40:0.60, 0.45:0.55, 0.46:0.54 or 0.47:0.53, and mixed in a mortar. The resultant mixture was pressed in a disk mold with a diameter of 17 mm at a pressure of 115 kg/cm², baked at 700° C. for 12 hours in a stream of oxygen, and crushed in a mortar. Thus, a powder with an average particle size of 10 μm of a composite oxide represented by a composition formula, $Cu_{0.02}Mo_{0.98}O_3$, $Cu_{0.05}Mo_{0.95}O_3$, $Cu_{0.10}Mo_{0.90}O_3$, $Cu_{0.30}Mo_{0.70}O_3$, $Cu_{0.40}Mo_{0.60}O_3$, $Cu_{0.45}Mo_{0.55}O_3$, $Cu_{0.46}Mo_{0.54}O_3$ or $Cu_{0.47}Mo_{0.53}O_3$, was prepared. Batteries X1 through X7 and a battery B4 were fabricated in the same manner as in Embodiment 1 except that the composite oxide represented by the composition formula, $Cu_{0.20}Mo_{0.80}O_3$, was replaced with the thus prepared composite oxides, respectively. The batteries X1 through X7 are first batteries, and the battery B4 is a comparative battery. Each of the batteries was subjected to the charge-discharge cycle test under the same conditions as that for the first batteries A1 through A6 and the comparative battery B1 in Experiment 1, so as to obtain the capacity retention ratio. The discharge voltage (an average discharge voltage until the discharge end voltage was attained), the initial capacity (the discharge capacity at the 1st cycle) and the capacity retention ratio of each battery are shown in Table 2. FIG. 2 is a graph for showing the relationship between x in a composition formula, $Cu_xMo_{1-x}O_3$, and the charge-discharge cycle performance, in which the ordinate indicates the capacity retention ratio (%) and the abscissa indicates the value of x in the composition formula, $Cu_xMo_{1-x}O_3$. The capacity retention ratios of the first battery A1 and the comparative battery B1 are also shown in Table 2 and FIG. 2.

TABLE 2

| Battery | x in composition formula | Discharge voltage (V) | Initial capacity (mAh) | Capacity retention ratio (%) |
| --- | --- | --- | --- | --- |
| B1 | 0 | 2.2 | 1.15 | 60 |
| X1 | 0.02 | 2.2 | 1.18 | 80 |
| X2 | 0.05 | 2.2 | 1.22 | 84 |
| X3 | 0.10 | 2.2 | 1.22 | 87 |
| A1 | 0.20 | 2.2 | 1.22 | 88 |
| X4 | 0.30 | 2.2 | 1.20 | 88 |
| X5 | 0.40 | 2.2 | 1.17 | 85 |
| X6 | 0.45 | 2.2 | 1.12 | 80 |
| X7 | 0.46 | 2.2 | 1.09 | 63 |
| B4 | 0.47 | 2.2 | 1.05 | 57 |

It is understood from Table 2 and FIG. 2 that the charge-discharge cycle performance can be improved when x is larger than 0 and 0.46 or smaller in the composite oxide, and that x is preferably 0.02 through 0.45 and more preferably 0.05 through 0.40 in the composite oxide in order to largely improve the charge-discharge cycle performance. Although the relationship between x in the composition formula, $Cu_xMo_{1-x}O_3$, and the charge-discharge cycle performance was examined in Experiment 2 by exemplifying the case where the transition element M is Cu, it was also confirmed that x in the composition formula, $M_xMo_{1-x}O_3$, of the composite oxide is preferably 0.02 through 0.45 and more preferably 0.05 through 0.40 regardless of the kind of transition element M in order to largely improve the charge-discharge cycle performance.

EXPERIMENT 3

Second batteries and comparative batteries were fabricated so as to compare the charge-discharge cycle performance thereof.

EMBODIMENTS 12 THROUGH 17

Preparation of Positive Electrodes

Vanadium (V), chromium (Cr), molybdenum (Mo), tungsten (W), manganese (Mn) or iron (Fe) (each with purity of 99.9%) and niobium (Nb) (with purity of 99.9%) were weighed out in an atomic ratio of 0.2:1.8 and mixed in a mortar. The obtained mixture was pressed in a disk mold with a diameter of 17 mm at a pressure of 115 kg/cm$^2$, baked at 1000° C. for 10 hours in an oxygen atmosphere and crushed in a mortar, thereby preparing a powder with an average particle size of 10 μm of a composite oxide represented by a composition formula, $V_{0.2}Nb_{1.8}O_5$, $Cr_{0.2}Nb_{1.8}O_5$, $Mo_{0.2}Nb_{1.8}O_5$, $W_{0.2}Nb_{1.8}O_5$, $Mn_{0.2}Nb_{1.8}O_5$, or $Fe_{0.2}Nb_{1.8}O_5$.

Each of the composite oxide powders serving as a positive electrode active material, a carbon powder serving as a conductive agent and a poly(vinylidene fluoride) powder serving as a binder were mixed in a weight ratio of 85:10:5, and the resultant was mixed with NMP (N-methyl-2-pyrrolidone) to give slurry. The slurry was applied on one surface of an aluminum collector with a thickness of 20 μm by the doctor blade method and dried at 150° C., and the resultant was punched into a disk. Thus, positive electrodes each with a diameter of 10 mm and a thickness of approximately 80 μm were prepared.

Each of the positive electrodes was stacked on disk-shaped metallic lithium serving as a counter electrode with a separator (a polypropylene film with ionic permeability) sandwiched therebetween, thereby preparing an electrode body. The electrode body was immersed in a nonaqueous electrolyte obtained by dissolving LiPF$_6$ in a concentration of 1 mol/liter in a mixed solvent including ethylene carbonate and diethyl carbonate in a volume ratio of 1:1. Under this condition, electrolysis was conducted with a current of 100 μA to 1.0 V (vs. Li/Li$^+$), so as to incorporate lithium into the composite oxide of each positive electrode.

Preparation of Negative Electrode:

A natural graphite powder and a poly(vinylidene fluoride) powder serving as a binder were mixed in a weight ratio of 95:5, and the resultant was mixed with NMP (N-methyl-2-pyrrolidone) to give slurry. The slurry was applied on one surface of a copper collector with a thickness of 20 μm by the doctor blade method, and dried at 150° C., and the resultant was punched into a disk. Thus, a negative electrode with a diameter of 10 mm and a thickness of approximately 60 μm was prepared.

Preparation of Nonaqueous Electrolyte:

A nonaqueous electrolyte was prepared by dissolving LiPF$_6$ in a concentration of 1 mol/liter in a mixed solvent including ethylene carbonate and diethyl carbonate in a volume ratio of 1:1.

Fabrication of Lithium Secondary Batteries:

Flat lithium secondary batteries A12 through A17 (second batteries) were fabricated in the same manner as in Experiment 1 except that each of these positive electrodes, the negative electrode and the nonaqueous electrolyte thus prepared were used.

EMBODIMENTS 18 AND 19

A positive electrode was prepared in the same manner as in Embodiment 12, whereas the electrolysis for incorporating lithium into the composite oxide ($V_{0.20}Nb_{1.8}O_5$) of the positive electrode was not conducted. Furthermore, a rolled sheet of metallic lithium or a lithium-aluminum alloy sheet (with a lithium content of 20.6 wt %) was punched into a disk. Thus, two kinds of negative electrodes each with a diameter of 10 mm and a thickness of 1.0 mm were prepared. Second batteries A18 and A19 were fabricated in the same manner as in Embodiment 12 except that this positive electrode and each of these negative electrodes were used.

COMPARATIVE EXAMPLE 5

A Nb$_2$O$_5$ powder serving as a positive electrode active material, a carbon powder serving as a conductive agent and a poly(vinylidene fluoride) powder serving as a binder were mixed in a weight ratio of 85:10:5, and the resultant was mixed with NMP (N-methyl-2-pyrrolidone) to give slurry. The slurry was applied on one surface of an aluminum collector with a thickness of 20 μm by the doctor blade method and dried at 150° C., and the resultant was punched into a disk. Thus, a positive electrode with a diameter of 10 mm and a thickness of approximately 80 μm was prepared. Subsequently, the electrolysis was conducted under the same conditions as in Embodiments 12 through 17, thereby incorporating lithium into Nb$_2$O$_5$. A comparative battery B5 was fabricated in the same manner as in Embodiment 12 except that this positive electrode was used.

Charge-discharge Cycle Performance of Respective Batteries

With respect to each of the second batteries A12 through A17 and the comparative battery B5, 50 charge-discharge cycles were run in each cycle of which the battery was charged to 3.0 V with 100 μA and discharged to 1.0 V with 100 μA, so as to obtain the capacity retention ratio at the 50th cycle in accordance with a formula below. With respect to the second batteries A18 and A19, each battery was discharged to 1.0 V with 100 μA, and 50 charge-discharge cycles were run in each cycle of which the battery was charged to 3.0 V with 100 μA and discharged to 1.0 V with 100 μA, so as to obtain the capacity retention ratio at the 50th cycle in accordance with the formula below. The charge-discharge cycle tests were all conducted at room temperature (25° C.). The initial capacity (the discharge capacity at the 1st cycle) and the capacity retention ratio of each battery are shown in Table 3.

Capacity retention ratio (%)=(Discharge capacity at 50th cycle/ Discharge capacity at 1st cycle)×100

TABLE 3

| Battery | Positive electrode active material | Negative electrode material | Initial capacity (mAh) | Capacity retention ratio (%) |
|---|---|---|---|---|
| A12 | $V_{0.2}Nb_{1.8}O_5$ | graphite | 1.5 | 92 |
| A13 | $Cr_{0.2}Nb_{1.8}O_5$ | graphite | 1.4 | 91 |
| A14 | $Mo_{0.2}Nb_{1.8}O_5$ | graphite | 1.5 | 93 |
| A15 | $W_{0.2}Nb_{1.8}O_5$ | graphite | 1.4 | 94 |
| A16 | $Mn_{0.2}Nb_{1.8}O_5$ | graphite | 1.3 | 92 |
| A17 | $Fe_{0.2}Nb_{1.8}O_5$ | graphite | 1.4 | 90 |
| A18 | $V_{0.2}Nb_{1.8}O_5$ | metallic lithium | 1.3 | 73 |
| A19 | $V_{0.2}Nb_{1.8}O_5$ | lithium alloy | 1.2 | 75 |
| B5 | $Nb_2O_5$ | graphite | 1.3 | 54 |

It is understood from Table 3 that the second batteries A12 through A19 have large capacity retention ratios and exhibit better charge-discharge cycle performance than the comparative battery B5. Furthermore, on the basis of comparison in the capacity retention ratio between the second battery A12 and the second batteries A18 and A19, it is understood that graphite (carbon material) with no fear of generation of dendrite during repeated charge and discharge is preferred as the negative electrode material for obtaining a lithium secondary battery exhibiting good charge-discharge cycle performance.

EXPERIMENT 4

The relationship between x in a composition formula, $M_xNb_{2-x}O_5$, and the charge-discharge cycle performance was examined.

Figure 3:
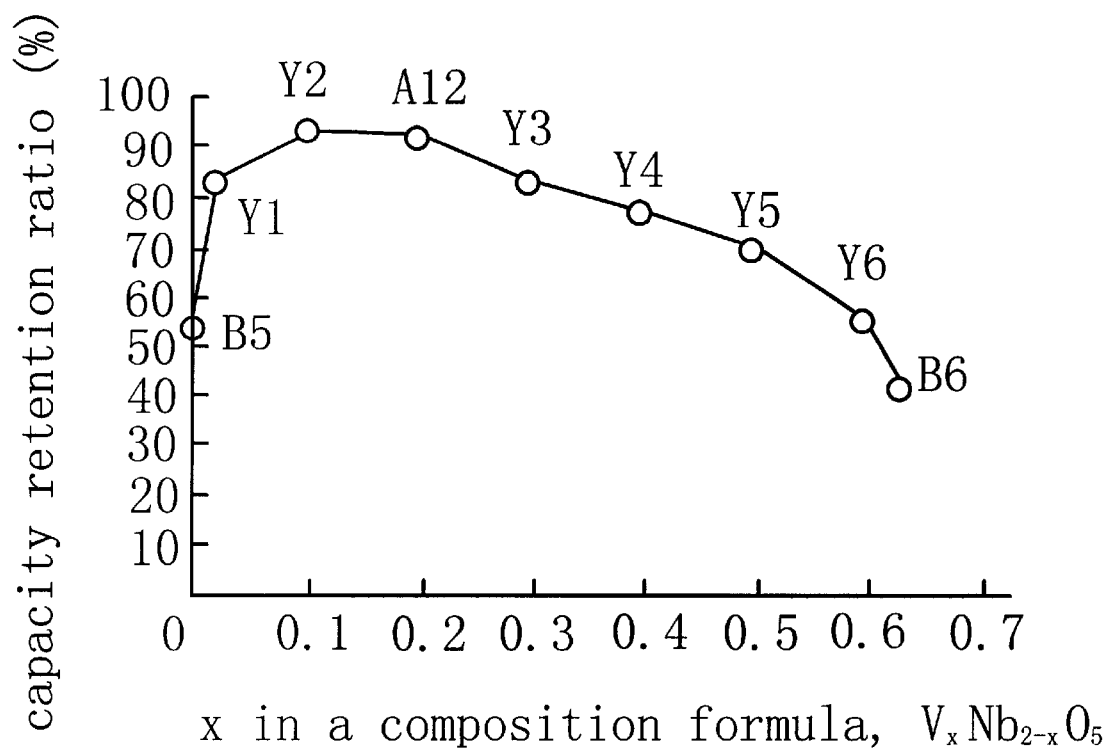
FIG. 3 is a graph for showing the relationship between x in a composition formula, $V_xNb_{2-x}O_5$, and charge-discharge cycle performance.

Vanadium (V) (with purity of 99.9%) and niobium (Nb) (with purity of 99.9%) were weighed out in an atomic ratio of 0.02:1.98, 0.1:1.9, 0.3:1.7, 0.4:1.6, 0.5:1.5, 0.6:1.4 or 0.63:1.37, and mixed in a mortar. The resultant mixture was pressed in a disk mold with a diameter of 17 mm at a pressure of 115 kg/cm², baked at 1000° C. for 10 hours in an oxygen atmosphere, and crushed in a mortar. Thus, a powder with an average particle size of 10 μm of a composite oxide represented by a composition formula, $V_{0.02}Nb_{1.98}O_5$, $V_{0.1}Nb_{1.9}O_5$, $V_{0.3}Nb_{1.7}O_5$, $V_{0.4}Nb_{1.6}O_5$, $V_{0.5}Nb_{1.5}O_5$, $V_{0.6}Nb_{1.4}O_5$, or $V_{0.63}Nb_{1.37}O_5$, was prepared. Batteries Y1 through Y6 and a battery B6 were fabricated in the same manner as in Embodiment 12 except that the composite oxide represented by the composition formula, $V_{0.2}Nb_{1.8}O_5$, was replaced with the thus prepared composite oxides, respectively. The batteries Y1 through Y6 are second batteries, and the battery B6 is a comparative battery. Each of the batteries was subjected to the charge-discharge cycle test under the same conditions as that for the second batteries A12 through A17 and the comparative battery B5 in Experiment 3, so as to obtain the capacity retention ratio. The initial capacity and the capacity retention ratio of each battery are shown in Table 4. FIG. 3 is a graph for showing the relationship between x in a composition formula, $V_xNb_{2-x}O_5$, and the charge-discharge cycle performance, in which the ordinate indicates the capacity retention ratio (%) and the abscissa indicates the value of x in the composition formula, $V_xNb_{2-x}O_5$. The capacity retention ratios of the second battery A12 and the comparative battery B5 are also shown in Table 4 and FIG. 3.

TABLE 4

| Battery | x in composition formula | Initial capacity (mAh) | Capacity retention ratio (%) |
|---|---|---|---|
| B5 | 0 | 1.3 | 54 |
| Y1 | 0.02 | 1.4 | 83 |
| Y2 | 0.1 | 1.6 | 93 |
| A12 | 0.2 | 1.5 | 92 |
| Y3 | 0.3 | 1.4 | 83 |
| Y4 | 0.4 | 1.4 | 77 |
| Y5 | 0.5 | 1.3 | 70 |
| Y6 | 0.6 | 1.2 | 56 |
| B6 | 0.63 | 1.2 | 42 |

It is understood from Table 4 and FIG. 3 that the charge-discharge cycle performance can be improved when x is larger than 0 and 0.6 or smaller in the composite oxide, and that x should be 0.02 through 0.3 in the composite oxide in order to largely improve the charge-discharge cycle performance. Although the relationship between x in the composition formula, $V_xNb_{2-x}O_5$, and the charge-discharge cycle performance was examined in Experiment 4 by exemplifying the case where the transition element M is V, it was also confirmed that x in the composition formula, $M_xNb_{2-x}O_5$, of the composite oxide should be 0.02 through 0.3 regardless of the kind of transition element M in order to largely improve the charge-discharge cycle performance.

In the aforementioned embodiments, application of the invention to a flat lithium secondary battery was described. However, the invention is not limited in the shape of a battery but is applicable to any lithium secondary batteries in various shapes including a cylindrical shape.

Obviously, numerous modifications and variations of the present invention are possible in light of the above teachings. It is therefore to be understood that within the scope of the appended claims the invention may be practiced otherwise than as specifically described herein.

What is claimed is:

1. A lithium secondary battery comprising a positive electrode, a negative electrode and a nonaqueous electrolyte,
   one of the positive electrode and the negative electrode including, as an active material, an orthorhombic composite oxide represented by a composition formula, $M_xMo_{1-x}O_y$, wherein M is at least one transition element selected from the group consisting of Cu, V, Mn, Fe, Co and Ni; $0<x\leq0.46$; and $2.6\leq y\leq3.1$, or an orthorhombic lithium-containing composite oxide obtained by incorporating lithium into the orthorhombic composite oxide.

2. A lithium secondary battery comprising a positive electrode, a negative electrode and a nonaqueous electrolyte,
   the positive electrode including, as an active material, an orthorhombic lithium-containing composite oxide obtained by incorporating lithium into an orthorhombic composite oxide represented by a composition formula, $M_xMo_{1-x}O_y$, wherein M is at least one transition element selected from the group consisting of Cu,V, Mn, Fe, Co and Ni; $0<x\leq0.46$; and $2.6\leq y\leq3.1$, and
   the negative electrode including, as a lithium ion occluding agent, a carbon material or a lithium-containing carbon material obtained by incorporating lithium into a carbon material.

3. A lithium secondary battery comprising a positive electrode, a negative electrode and a nonaqueous electrolyte,
   the positive electrode including, as an active material, an orthorhombic composite oxide represented by a composition formula, $M_xMo_{1-x}O_y$, wherein M is at least one transition element selected from the group consisting of Cu, V, Mn, Fe, Co and Ni; $0<x\leq0.46$; and $2.6\leq y\leq3.1$, and the negative electrode including, as a lithium ion occluding agent, a lithium-containing carbon material obtained by incorporating lithium into a carbon material.

4. A lithium secondary battery comprising a positive electrode, a negative electrode and a nonaqueous electrolyte, the positive electrode including a lithium-containing transition metal oxide as an active material, and the negative electrode including, as an active material, an orthorhombic composite oxide represented by a composition formula, $M_xMo_{1-x}O_y$, wherein M is at least one transition element selected from the group consisting of Cu. V, Mn, Fe, Co and Ni; $0<x\leq0.46$; and $2.6\leq y\leq3.1$.

5. The lithium secondary battery according to any one of claims 1 through 4, wherein $0.02\leq x\leq0.45$ in the composition formula, $M_xMo_{1-x}O_y$, representing the orthorhombic composite oxide.

6. The lithium secondary battery according to any one of claims 1 through 4, wherein $0.05\leq x\leq0.40$ in the composition formula, $M_xMo_{1-x}O_y$, representing the orthorhombic composite oxide.

7. A lithium secondary battery comprising a positive electrode, a negative electrode and a nonaqueous electrolyte, the positive electrode including, as an active material, an orthorhombic composite oxide represented by a composition formula, $M_xNb_{2-x}O_y$, wherein M is at least one transition element selected from the group consisting of V, Cr, Mo, W, Mn and Fe; $0<x\leq0.6$; and $4.7\leq y\leq5.3$, or an orthorhombic lithium-containing composite oxide obtained by incorporating lithium into the orthorhombic composite oxide.

8. A lithium secondary battery comprising a positive electrode, a negative electrode and a nonaqueous electrolyte, the positive electrode including, as an active material, an orthorhombic lithium-containing composite oxide obtained by incorporating lithium into an orthorhombic composite oxide represented by a composition formula, $M_xNb_{2-x}O_y$, wherein M is at least one transition element selected from the group consisting of V, Cr, Mo, W, Mn and Fe; $0<x\leq0.6$; and $4.7\leq y\leq5.3$, and the negative electrode including, as a lithium ion occluding agent, a carbon material or a lithium-containing carbon material obtained by incorporating lithium into a carbon material.

9. A lithium secondary battery comprising a positive electrode, a negative electrode and a nonaqueous electrolyte, the positive electrode including, as an active material, an orthorhombic composite oxide represented by a composition formula, $M_xNb_{2-x}O_y$, wherein M is at least one transition element selected from the group consisting of V, Cr, Mo, W. Mn and Fe; $0<x\leq0.6$; and $4.7\leq y\leq5.3$, and the negative electrode including, as a lithium ion occluding agent, a lithium-containing carbon material obtained by incorporating lithium into a carbon material.

10. The lithium secondary battery according to any one of claims 7 through 9, wherein $0.02\leq x\leq0.3$ in the composition formula, $M_xNb_{2-x}O_y$, representing the orthorhombic composite oxide.

* * * * *